United States Patent [19]
Jarger

[11] 3,888,088
[45] June 10, 1975

[54] STABILIZING ATTENUATION OF A SEA WATER WIRE LINK
[75] Inventor: Harold F. Jarger, Rochelle Park, N.J.
[73] Assignee: International Telephone and Telegraph Corporation, Nutley, N.J.
[22] Filed: Sept. 11, 1972
[21] Appl. No.: 287,956

[52] U.S. Cl............ 61/72.3; 174/28; 174/102 SC; 174/110 S; 174/120 SC; 427/118
[51] Int. Cl............................................ B44d 1/18
[58] Field of Search... 117/218, 232, 135.1, 132 BS, 117/66; 118/8, 9; 61/72.3, 72.7; 174/102 SC, 120 SC, 110 S, 23 C, 28

[56] References Cited
UNITED STATES PATENTS

| 3,006,785 | 10/1961 | Canegallo | 117/218 |
|---|---|---|---|
| 3,047,448 | 7/1962 | Feller et al. | 174/110 S |
| 3,099,578 | 7/1963 | Hunter | 117/217 |
| 3,136,529 | 6/1964 | Dickinson et al. | 61/72.3 |
| 3,229,660 | 1/1966 | McLucas et al. | 118/8 |
| 3,290,167 | 12/1966 | Wood et al. | 118/9 |
| 3,362,323 | 1/1968 | Wada et al. | 118/8 |
| 3,573,976 | 4/1971 | Duane | 117/232 |
| 3,576,387 | 4/1971 | Derby | 174/102 SC |
| 3,589,136 | 6/1971 | Sorenson | 61/72.3 |
| 3,684,821 | 8/1972 | Mixauchi et al. | 117/232 |

OTHER PUBLICATIONS
Tecknit Data Sheet CS-721, Published by Technical Wire Products, Inc. of Cranford, N.J., March 29, 1971.

Primary Examiner—Cameron K. Weiffenbach
Attorney, Agent, or Firm—John T. O'Halloran; Menotti J. Lombardi, Jr.

[57] ABSTRACT

A light-bonding conductive agent such as conductive grease is applied to the insulation of an insulated two-wire communications cable for rendering the attenuation thereof substantially constant irrespective of the length of the cable unwound from a spool and exposed to sea water. Means are provided for determining whether additional conductive agent should be applied to the cable as the latter is being payed out.

2 Claims, 4 Drawing Figures

 
Fig. 1A  Fig. 1B
Fig. 2
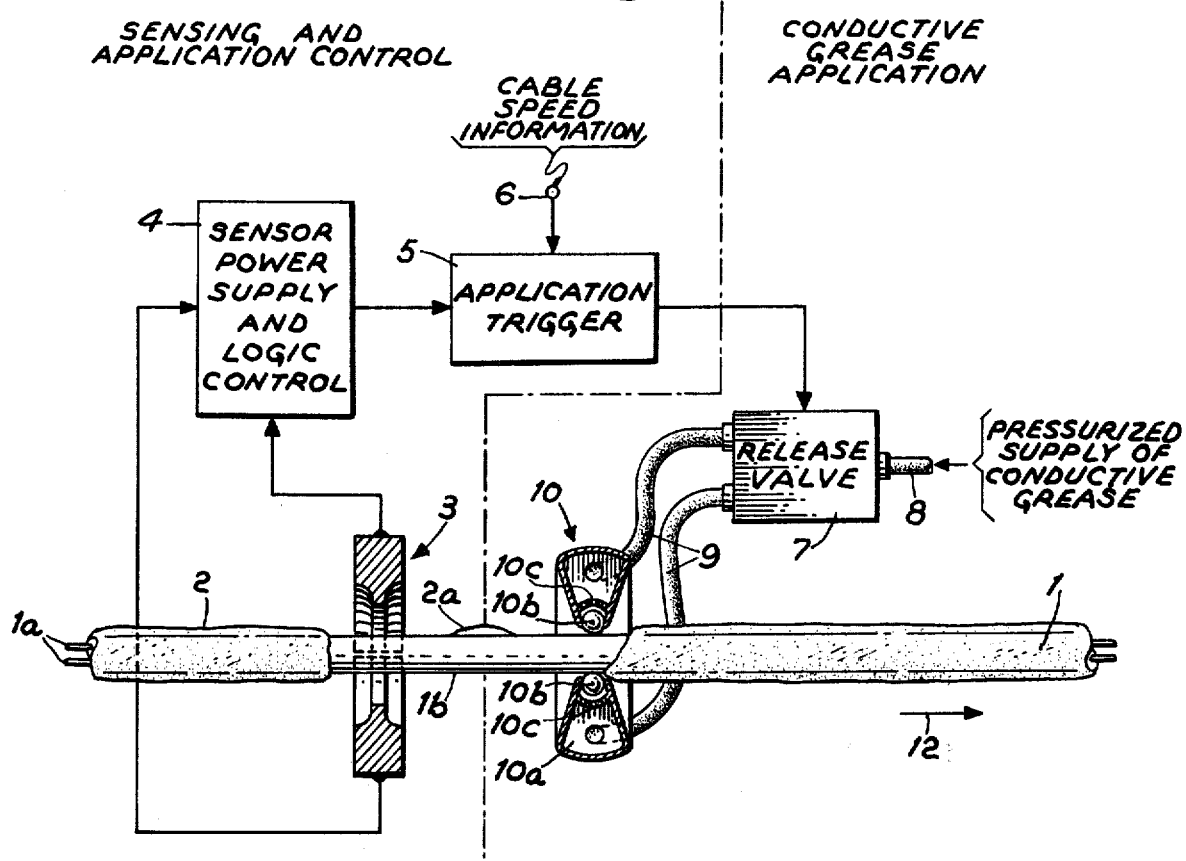
Fig. 3
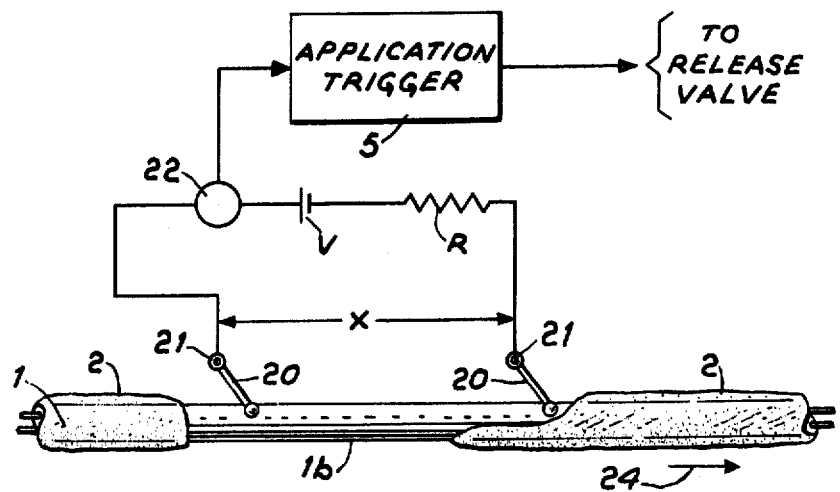

STABILIZING ATTENUATION OF A SEA WATER WIRE LINK

BACKGROUND OF THE INVENTION

This invention relates to the stabilization of attenuation over long lines for communications, and more particularly to stabilizing the attenuation of a sea water wire link irrespective of the length of cabling payed-out and exposed to sea water.

An example application of the invention may be found in paying out a wound spool of communication cable from a fully submerged submarine, with the one end of the cable coupled to a surfaced buoy launched under water from the submarine. The invention therefore relates to the disclosure contained in U.S. Pat. No. 3,755,836 assigned to the assignee of the instant application, which disclosure, insofar as it is relevant to the present invention at least for purposes of clarification and sufficiency of disclosure, is incorporated herein by reference.

In paying out the buoy-attached communication cable, typically an insulated two-wire cable, the attenuation of a sea water wire link will vary by as much as 40 or 50 db at audio frequencies. This attenuation is a function of the length of wire unwound from a spool exposed to the sea water. Measured data indicates that the capacity from each wire to sea water increases at a rate of approximately 0.04uf/100 ft. of exposed wire link. This change in capacity loading changes the attenuation. Thus, much more expensive and versatile amplifiers are required to handle these large variations in signal transmission properties.

Amplifiers having specific limited operating characteristics, and therefore less costly and smaller in size, could be employed if this attenuation variation were somehow rendered largely constant whether the cable is fully wound up on the spool or entirely payed out. The attenuation change could be minimized if the wire link spool were to be wound and impregnated in a conductive grease or low tensile strength conductive bonding agent. Although the attenuation in the fully wound condition would be higher than without the conductive agent, there would be little or no change as the spool is unwound and exposed to sea water.

SUMMARY OF THE INVENTION

It is therefore the principal object of this invention to stabilize the attenuation of a sea water wire link by impregnating the wire link spool in a light-bonding conductive agent such as a conductive grease.

According to the broader aspects of the invention there is provided stabilized attenuation of a sea water wire link comprising a cable, having at least one insulation-covered wire, to be payed out into sea water from a wound mode, said cable having applied to the surface of the insulation a coating of a light-bonding conductive agent for rendering the link attenuation substantially constant for any given amount of cable unwound and exposed to the sea water.

Moreover, according to the invention there is provided a method for stabilizing a sea water wire link comprising applying a substantially uniform layer of light-bonding conductive agent to the surface of the insulation covering of the wire link.

A feature of the invention is that the initial application of the conductive grease or light bonding agent occurs while the cable is wound on its spool for the first time.

Another feature is that means are employed for determining whether additional conductive agent is required as the cable is payed out, this means in turn controlling second means for applying the additional conductive agent to the moving cable from a pressurized source.

BRIEF DESCRIPTION OF THE DRAWINGS

The above-mentioned and other objects and features of this invention will become more apparent and the invention itself will be best understood by reference to the following description taken in conjunction with the accompanying drawings, in which:

FIGS. 1A and 1B respectively illustrate in side and end views a portion of a communication cable coated with a conductive grease or agent;

FIG. 2 illustrates an embodiment for detecting the need for additional conductive grease and the application of same in response thereto; and FIG. 3 illustrates another embodiment performing substantially the same function as the arrangement according to FIG. 2.

DESCRIPTION OF THE PREFERRED EMBODIMENTS

Referring to FIGS. 1A and 1B, which are side and end views respectively of a section of typical 2-wire conductor cable 1, the two wires 1a are embedded in an insulation in a well known manner. To the surface of this insulation is applied a light-bonding conductive agent 2 such as a conductive grease. Examples of substances to be employed here include silver or copper conductive lubricants which bear the trademark ECCOSHIELD and made by Emmerson-Cummings; and silver silicone grease bearing the trademark TECKNIT, and made by Technical Wire Products Inc.

The conductive agent is intended to be initially applied to substantially the entire surface of the insulation of cable 1 in a roughly uniform thin layer when the cable is first wound up on its spool (not shown). The conductive grease or agent effectively renders the wire link coaxial cable-like in terms of performance. With the conductive grease in contact with a convenient ground on the spool, the insulation of the cable link becomes the dielectric separation between inner (the two wires) and the outer (the conductive grease) conductors. In this way the attenuation of the entire cable, though now somewhat higher than it would be wound up without the application of the conductive agent, remains substantially constant whether the cable is in fact wound up or entirely payed out and exposed to sea water.

With the attenuation thusly stabilized, the design criteria for required amplification is now easily determinable and largely fixed, thus making the amplifier design greatly simplified and less costly.

Provision is made in this disclosure of two arrangements, in FIGS. 2 and 3, which enable the automatic detection and maintenance of sufficient conductive grease on the cable 1 when the cable is being payed out. The layer of conductive agent 2 is greatly exaggerated in the figures relative to the cable dimensions for purposes of clarity.

Referring specifically to FIG. 2, the cable 1, in being payed out as indicated by the arrow 12, passes through a dielectric property sensor 3 arranged in the form of dual semi-annular elements. The sensor arrangement 3 is coupled to a sensor power supply and logic control 4, wherein "bare" spots or sections such as 1b on the cable are detected when passing therethrough by the accompanying rise above a predetermined threshold of the dielectric properties of the passing cable. Even though some deposits, such as 2a, are present on the insulation along this "dry" portion, they are insufficient to sustain a conductive path, and it is primarily this condition which is determined by the threshold setting in control arrangement 4.

Detection of a bare spot or non-conducting section of the conductive cable coating 2 causes to be generated at the output of sensor control 4 a signal which is applied to application trigger 5. A second input is also fed to trigger stage 5 in the form of a cable speed information input 6. By way of these two inputs, trigger 5 enables a determination of the time of application required relative to each passing non-conductive section of cable coating.

An output signal is produced from trigger 5 which sustains for as long as the bare section passes through an annular conductive agent applicator 10. This is easily determinable by conventional logic inasmuch as the distance between sensor 3 and applicator 10 is known, as is the speed of the passing cable in being payed out. This trigger signal causes a release valve 7 to open and thereby permit a pressurized supply of conductive grease or agent to be moved along conduits 8 and 9 to the applicator 10.

Applicator 10 is essentially a hollow annular or donut-shaped member having more or less a trapezoidal cross-section. Near the center hole of the donut-shaped member are mounted therein ball bearings 10b, held in place by a freely perforated annular sheet 10c. The barr bearings 10b serve the dual application of permitting the cable to glide easily through the applicator 10 while also assisting in the flow and deposition of the conductive agent on the cable surface.

By this arrangement, conductive grease is intended to be deposited on the wire link only when being payed out. A more simple arrangement would be merely to apply additional conductive grease to the cable as it is payed out regardless of the former residual grease conditions. This would of course eliminate the requirement for the sensor 3 and sensor control 4 at the minimum. In either arrangement, however, it is deemed unnecessary to apply additional conductive agent to the cable when being wound up again, inasmuch as the cable in the wound up mode assures greater control for continuity on the surface of the cable insulation. Were it deemed necessary to add to the grease already on the cable as it is being rewound, a second sensor 3 could be positioned to the right of applicator 10 in FIG. 2 with a similar separation therebetween. Provision could be made in sensor control 4 to accept information only from the sensor 3 which precedes applicator 10 relative to the direction of cable movement, as indicated generally in FIG. 2 by arrow 12.

FIG. 3 illustrates another embodiment for detecting bare sections of cable. When a bare section 1b passes between two metallic pins 20, which are in continual contact by way of one end thereof with the cable 1, current flow therebetween is reduced to less than a predetermined minimum. This condition is sensed by a series circuit comprising a means 22 for sensing a threshold current flow over a unit length X, a supply battery V, and a small resistance R for avoiding a short circuit condition. A break in the conductive properties between the two pins 20 causes means 22 to send an actuating signal to trigger 5, with the remainder of this arrangement operating as in FIG. 2.

Pins 20 are freely pivotable at 21 to follow the cable 1. The free end thereof in contact with the cable are rounded and blunt to avoid scratching the cable.

In either of the arrangements according to FIGS. 2 and 3, a continual conductive path of grease is maintained on the surface of the cable insulation to ensure a stabilization of the attenuation of the cable as it is payed out from the wound up mode into sea water; for instance to effect communications by way of a surface buoy coupled to the cable, which buoy was launched from a submerged and moving submarine.

While the principles of this invention have been described above in connection with specific apparatus, it is to be understood that this description is made only by way of example and not as limiting on the scope of the invention as set forth in the objects and features thereof and in the accompanying claims.

I claim:

1. A method for providing a communications cable having a constant attenuation characteristic in sea water comprising:
    a. providing a length of insulated communications cable;
    b. applying a conductive grease to the outer surface of said cable;
    c. connecting said conductive grease to an electrical ground; and
    d. submerging said cable into the sea water.

2. The method of claim 1 wherein said electrically conductive grease comprises an electrically conductive silicone grease.

* * * * *